United States Patent [19]
McLaughlin et al.

[11] Patent Number: 5,548,444
[45] Date of Patent: Aug. 20, 1996

[54] OPTICAL BEAM HOMOGENIZING APPARATUS AND METHOD

[75] Inventors: Joseph L. McLaughlin, Marblehead, Mass.; Mark R. Fernald, Amherst, N.H.; Kenneth J. Harte, Carlisle, Mass.

[73] Assignee: Hughes Danbury Optical Systems, Inc., Danbury, Conn.

[21] Appl. No.: 271,029

[22] Filed: Jul. 6, 1994

[51] Int. Cl.[6] .................................................. G02B 27/12
[52] U.S. Cl. .......................... 359/629; 359/640; 359/837
[58] Field of Search .................................... 359/639, 640, 359/737, 738, 739, 740, 837, 618

[56] References Cited

U.S. PATENT DOCUMENTS

| | | | |
|---|---|---|---|
| 1,371,969 | 3/1921 | Furman | 359/640 |
| 1,490,751 | 4/1924 | Underhill | 359/640 |
| 2,527,896 | 10/1950 | Thirard | 359/640 |
| 3,045,533 | 7/1962 | Harmon | 88/14 |
| 3,523,732 | 8/1970 | Mary | 356/4 |
| 3,601,472 | 8/1971 | Gilkeson et al. | 350/196 |
| 3,663,087 | 5/1972 | Guillet et al. | 350/150 |
| 3,900,263 | 8/1975 | Hall, Jr. | 359/837 |
| 4,109,304 | 8/1978 | Khvalovsky | 359/627 |
| 4,475,027 | 10/1984 | Pressley | 219/121 |
| 4,492,440 | 1/1985 | Nishioka | 350/445 |
| 4,744,615 | 5/1988 | Fan et al. | 350/96.10 |
| 4,793,694 | 12/1988 | Liu | 350/379 |
| 4,861,148 | 8/1989 | Sato | 359/618 |
| 5,025,438 | 6/1991 | Emoto | 359/640 |
| 5,153,777 | 10/1992 | Okada et al. | 359/692 |
| 5,224,200 | 6/1993 | Rasmussen et al. | 385/146 |
| 5,317,450 | 5/1994 | Kamon | 359/566 |

FOREIGN PATENT DOCUMENTS

| | | |
|---|---|---|
| 0230931 | 8/1987 | European Pat. Off. . |
| 895296 | 1/1945 | France ............... 359/640 |
| 91412 | 5/1984 | Japan ................. 359/640 |
| 63-208821 | 8/1988 | Japan . |
| 4171415 | 6/1992 | Japan ................. 359/640 |

OTHER PUBLICATIONS

D'yakonov, et al., "Method for enhancement of the spatial homogeneity of laser radiation using polarization coupling out of radiation," *Sov. J. Quantum Electron*, 20(4), 387–388 (Apr. 1990).

Wagner, et al., "Formation of p–n Junctions and Silicides in Silicon using a high performance laser beam homogenization system," *Applied Surface Science*, 43(1989):260–263 (1989).

Harte, et al., "Excimer laser light delivery system for micromachining," *SPIE O–E Fiber Lase*, (Sep. 6–10 1988).

Bunis, et al., "Producing a uniform excimer laser beam for materials processing applications," *SPIE, 1377* Excimer Laser Materials Processing and Beam Delivery Systems, 30–36 (1990).

*Primary Examiner*—Georgia Y. Epps
*Assistant Examiner*—Ricky Mack
*Attorney, Agent, or Firm*—W. C. Schubert; W. K. Denson-Low

[57] ABSTRACT

An optical beam homogenizer includes an entrance pupil through which a non-uniform optical beam propagates. A first optical component having plural flat surfaces receives the input beam. The flat surfaces of the first optical component effectively segment the entrance pupil by dividing the input beam into plural beamlets, one beamlet for each pupil segment and flat surface. The beamlets are received by a second optical component which also has multiple flat surfaces, each flat surface receiving a beamlet. The second optical component directs the beamlets toward each other such that they overlap at an exit pupil of the system. The second optical component also focuses the beamlets such that an image of each entrance pupil segment is formed at the exit pupil. The images of the individual entrance pupil segments are superimposed upon each other at the exit pupil to form a uniform optical output beam.

30 Claims, 6 Drawing Sheets

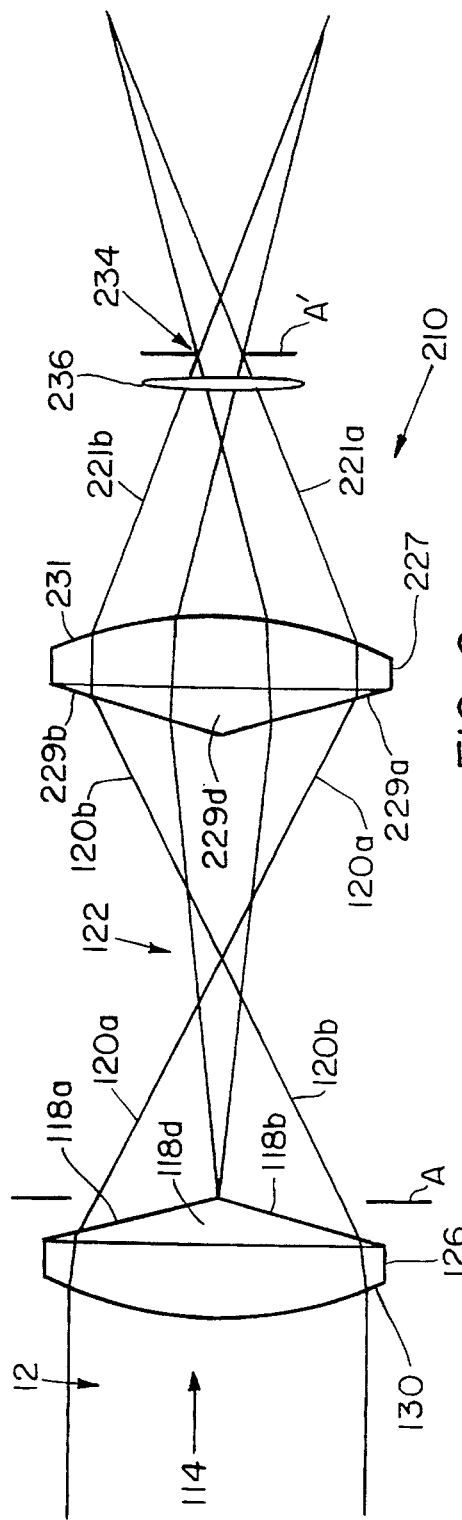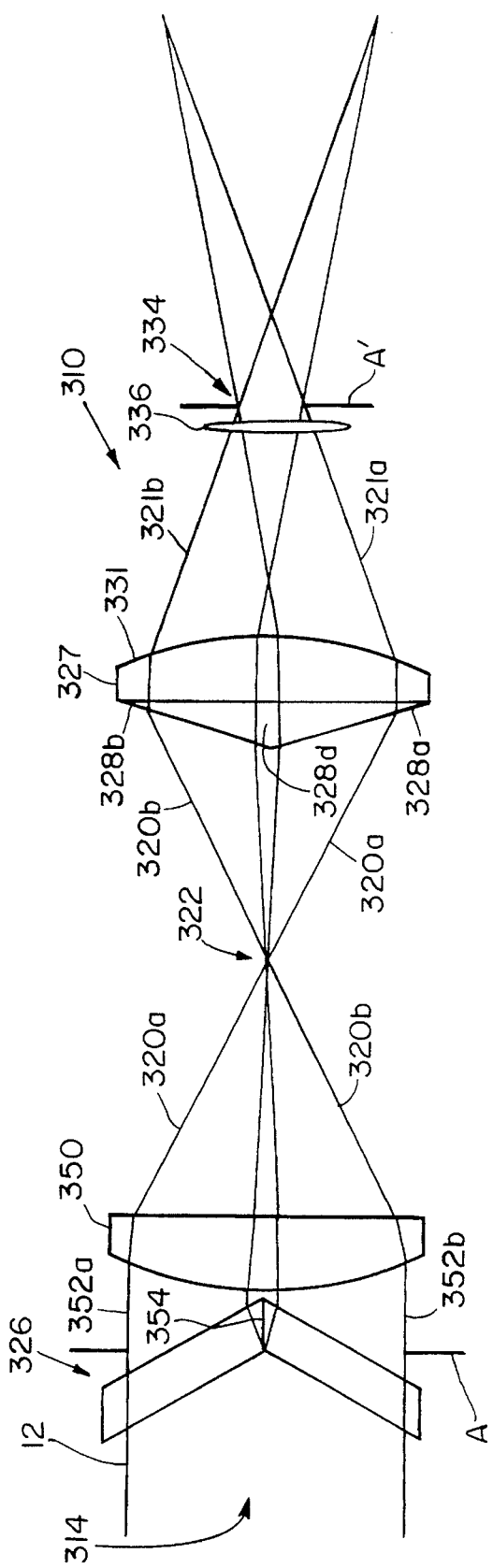

OPTICAL BEAM HOMOGENIZING APPARATUS AND METHOD

BACKGROUND OF THE INVENTION

Numerous systems utilize optical beams such as laser output beams as the source of illumination or radiation for photolithography, image mask projection, laser ablation and similar processes. The nature of laser sources however is such that the output laser beam is generally non-uniform. The consequence of this is that the process utilizing the beam can have unsatisfactory results. For example, material may be unevenly ablated or photosensitive materials may be unevenly exposed in photolithographic processes. Also, because the optical power distribution in the beam is non-uniform, power is not efficiently delivered where it is needed. Substantial power loss can result.

SUMMARY OF THE INVENTION

The present invention is directed to an apparatus and method for homogenizing a non-uniform optical beam such as a laser beam to produce a more uniform optical beam. The non-uniform beam passes through an entrance pupil of the homogenizer. The beam then strikes a first optical component having a plurality of flat surfaces, faces or facets which effectively segment the entrance pupil by dividing the beam into a plurality of beamlets, each beamlet containing light from a particular respective segment of the entrance pupil. The beamlets propagate to a second optical component which forms an image of each segment of the entrance pupil at an image plane and directs each of the beamlets such that images of individual pupil segments overlap or are superimposed over each other at the image plane.

In one embodiment, the second optical component also includes multiple flat faces or facets. Each face receives a beamlet from a corresponding face on the first optical component. The faces on the second optical component redirect the beamlets such that they overlap at the image plane located at the exit pupil of the system.

Each beamlet produced by the first optical component can be considered to propagate along its own longitudinal axis. In one embodiment, the first optical component directs the beamlets such that their longitudinal axes all propagate toward each other. The axes cross between the first and the second optical components. The second optical component then receives the beamlets as they are diverging from each other. It directs the beamlets back toward each other such that they overlap at the image plane to form the uniform image of the entrance pupil.

In one embodiment, the first optical component includes a pyramidal prism with multiple angled flat faces or facets, each of which creates a beamlet from the input beam. In one preferred embodiment, the pyramid prism has four facets and therefore creates four beamlets and divides the entrance pupil into four segments. The pyramidal prism is made of a single piece of glass or other similar material with the flat facets ground on its surface.

Another device which can be used as part of the first optical component is a plate prism. The device consists of multiple plates of glass or other refractive material which are positioned at angles relative to each other. Each plate separates an individual beamlet from the incoming non-uniform beam. As with the facets of the pyramidal prism, the plates are positioned at angles which direct the beamlets in desired directions.

The first optical component can also include a focusing element such as a lens to eliminate beam divergence within each of the individual beamlets. The lens can be separate from the pupil segmenting element, i.e., prism, pyramidal prism, plate prism, or it can be part of it. Thus the first optical component car be a prism/lens or a pyramidal prism/lens. In these cases, a single element performs both the beam dividing or pupil segmenting function as well as a focusing function.

In another embodiment, the first optical component can be a reflective element such as a faceted mirror. In that embodiment, once again, the entrance pupil is segmented. However, in this case, the individual beamlets are directed back toward the entrance pupil. Additional reflective elements are required to accept the individual beamlets and reflect them back toward an image plane. These reflective elements can simultaneously image each beamlet such that an image of each pupil segment is formed at the image plane. They also direct the beamlets such that the images of the pupil segments are superimposed upon each other. As with the purely refractive embodiments, a uniform beam output consisting of the images of the pupil segments superimposed upon each other is formed at an exit pupil.

The second optical component can also be one of various devices. As described immediately above, in the case of a reflective first optical component, the second optical component actually comprises several reflective surfaces which simultaneously image the beamlets and direct them such that images of the pupil segments are superimposed over each other.

In other embodiments, the second optical component comprises a refractive element having multiple facets or flat faces, one face for each beamlet. Each face of the second component receives and redirects a respective beamlet such that all the beamlets propagate toward each other. The second optical component also focuses each beamlet such that an image of each entrance pupil segment is formed at the image plane. The focusing portion and faceted portion work in conjunction to provide the images of the pupil segments superimposed over each other at the exit pupil of the system. The second optical component therefore can be a prism or pyramidal prism with a lens or it can be a one-piece prism/lens or a pyramidal prism/lens. It can also be a plate prism operating in conjunction with a separate lens, or it can be multiple prisms, each prism redirecting a single respective beamlet.

The homogenizer of the invention can produce multiple homogenized output beams from a single non-uniform input beam. In this case, the first optical component and second optical component are designed to provide multiple regions at the image plane at which the entrance pupil segments are superimposed. The first optical component comprises multiple flat faces which segment the input pupil by separating the input beam into beamlets. The second optical component receives the beamlets and focuses them to form images of the entrance pupil segments at the image plane. The flat faces of the second optical component are configured as desired to cause the images of selected segments to be superimposed at selected positions on the image plane to produce output beams at desired positions.

The optical beam homogenizer of the present invention provides significant advantages over prior systems. Other systems redirect light at the edges of a beam toward the center of the beam to homogenize the beam. This is done either refractively or reflectively. However, these prior systems do not reimage or focus the light which they redirect and therefore do not form an image of the entrance pupil. Consequently, the effects of diverging beams (such as power loss) are not minimized as they are in the present invention.

Also, because the device of the invention can use monolithic optics, e.g., the pyramid prism, prism/lens, pyramidal prism/lens, it is much easier to manufacture than other prior systems. Previous refractive homogenizers have used lenses that have been slabbed and stacked. The process of slabbing and stacking uses circular symmetric lenses or cylindrical lenses which are first slabbed by removing glass along a straight edge of the element. This requires precise removal of edge glass material with respect to the optical axis of the component. The edges must be polished and brought sharp, thus leaving them prone to fracture. After the slabbing process, the individual lens pieces are placed together, aligned by hand and mounted by mechanical pressure holding them together. Mechanical pressures must be used since optical cements are not compatible with high radiant flux frequently encountered in laser systems.

The homogenizer of the present invention can use conventional non-slabbed components. The required beam direction control is accomplished by utilizing the tilted flat surfaces or facets of the elements, all of which may be produced by conventional glass processing. Using centered prism/lenses or pyramid prisms avoids the necessity of mounting individual components and the associated concerns of edge fractures or inter-component fitting and associated tolerancing.

Also, the preferred embodiments of the homogenizer of the invention provide the advantage of using positive-angle optics, i.e., devices which are thicker at their central axes than they are at their edges. For example, the apex of the pyramid prism is located approximately at the center of the element. The tilted flat surfaces or faces of the pyramid are formed such that the element is thinner along its edges. This type of element is significantly easier to manufacture than negative-angle optics which are thinner in the middle than they are at their edges. Negative-angle devices typically must be made of individual pieces of optical material held together by mechanical pressures or optical adhesives. The individual pieces are first shaped, ground and/or polished as desired and then placed together. This is an expensive and time consuming process and yields devices of varying optical quality. In contrast, the positive-angle optics used in certain embodiments of the present invention allow the elements to be made monolithically, i.e., from a single piece of optical material using conventional glass processing techniques.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a schematic diagram of another alternative embodiment of the beam homogenizer of the present invention.

FIG. 7 is a schematic diagram of another alternative embodiment of the beam homogenizer of the present invention.

DETAILED DESCRIPTION OF THE INVENTION

Figure 1A:
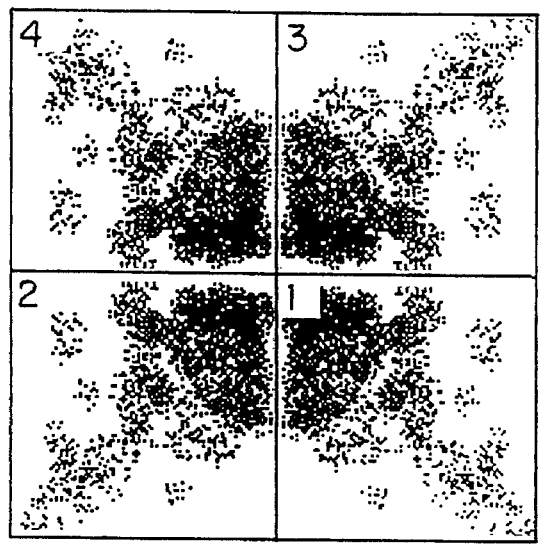
FIG. 1A–1C contain a schematic illustration of the beam homogenizing process of the invention.
Figure 1B:
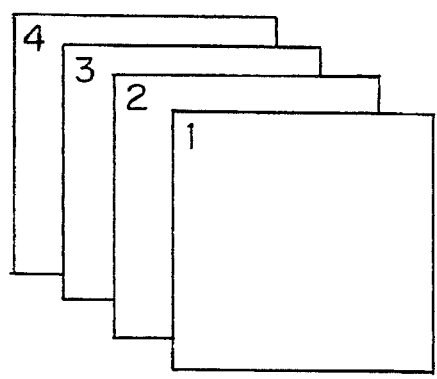
Figure 1C:
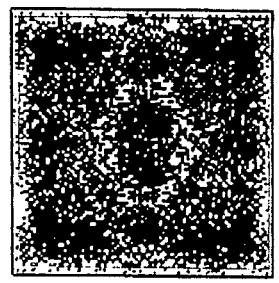

FIGS. 1A–1C schematically depict the operation of the optical beam homogenizer of the invention. FIG. 1A shows an optical intensity profile of a laser output beam in cross-section. The profile shows that the beam intensity is non-uniform over its cross-section. Although the beam is shown in a square configuration, it will be understood that the beam can assume any shape. This non-uniform beam enters the homogenizer of the system through its entrance pupil. The homogenizer segments or splits the entrance pupil into multiple pupil segments or regions by dividing the non-uniform beam into multiple beamlets. In the embodiment shown in FIG. 1A, the entrance pupil is split into four segments, numbered 1–4 as shown.

As discussed above, the beam homogenizer of the invention directs individual beamlets associated with the entrance pupil segments such that they overlap and images of the entrance pupil segments are superimposed at the output pupil of the system. That is, as shown in schematic perspective in FIG. 1B, the re-imaged individual entrance pupil segments are effectively stacked at the output pupil such that the segments are superimposed over each other. FIG. 1C shows in cross-section the resulting homogenized output beam with the re-imaged entrance pupil segments superimposed over each other.

Figure 2:
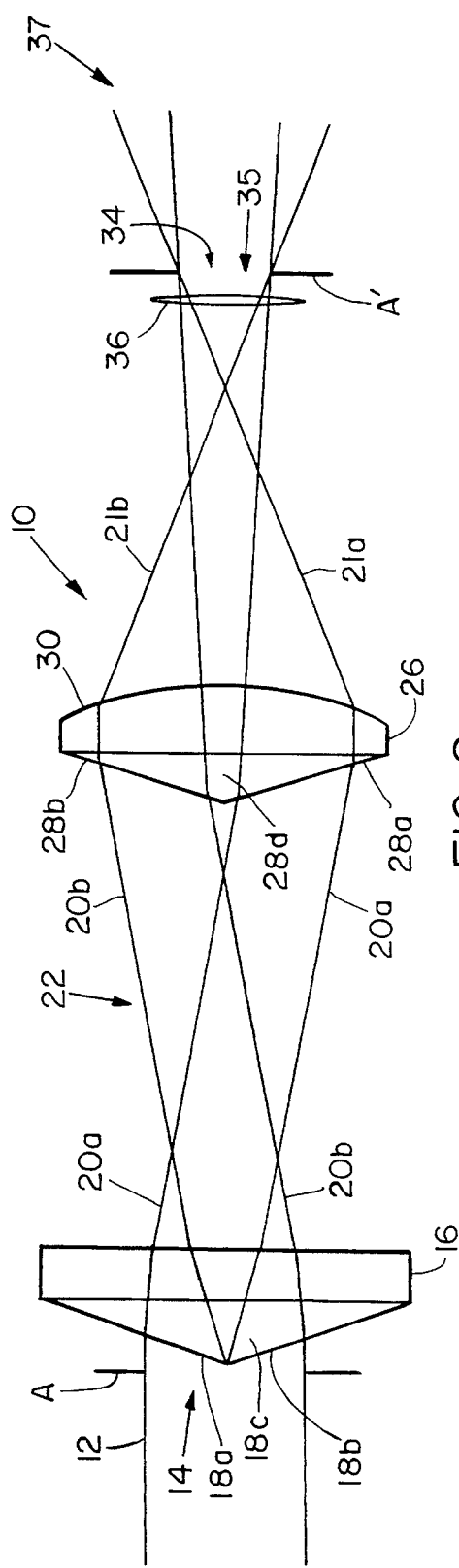
FIG. 2 is a schematic illustration of one embodiment of the beam homogenizer of the invention.

FIG. 2 is a schematic illustration of one embodiment of the beam homogenizer 10 of the present invention. An optical beam 12 such as a laser beam propagates through an entrance pupil 14 of the system 10 shown at entrance pupil plane A. The beam 12 strikes a pyramid prism 16 having multiple flat faces or facets 18a–18d. Facet 18d is the facet on the back side of the pyramid prism 16 and therefore is not seen in the drawing.

Figure 3:
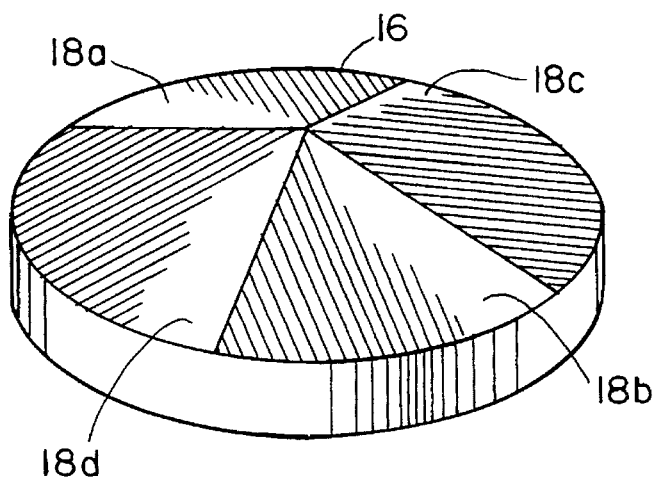
FIG. 3 is a schematic perspective view of a pyramid prism used in the present invention.

FIG. 3 is a perspective view of the pyramid prism 16 used in the embodiment 10 of the invention. In this embodiment, the prism 16 includes four flat faces or facets 18a–18d. It will be understood that four facets are shown for illustration only and that any number of facets, and therefore, any number of beamlets, can be used. The pyramid prism 16 is a monolithic element. That is, it is formed from a single piece of glass or other optical material by standard commercial processing techniques such as grinding, polishing, etc.

Referring back to FIG. 2, each facet 18a–18d of the pyramid prism 16 serves to effectively divide the entrance pupil 14 into multiple segments or regions by separating individual beamlets 20a–20d, respectively, from the input beam 12 by directing each individual beamlet in a unique direction. That is, facet 18a creates beamlet 20a by directing the portion of the beam 12 striking facet 18a in the direction indicated. Facet 18b creates beamlet 20b in the same fashion. It should be noted that facets 18c and 18d create corresponding beamlets 20c and 20d but they are not shown in the two-dimensional drawing of FIG. 2 in the interest of clarity.

Figure 4:
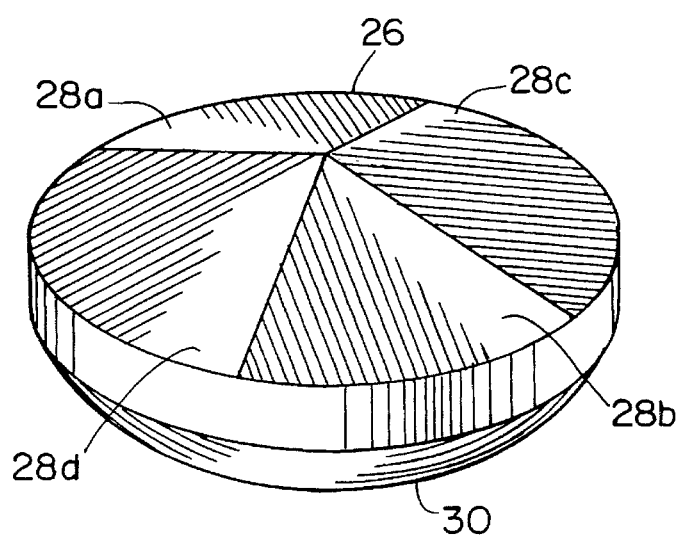
FIG. 4 is a schematic perspective view of a prism/lens used in the present invention.

The beamlets 20a–20d cross approximately in an area indicated by reference numeral 22. The beams then continue propagating in a divergent pattern until they reach a second optical component 26 which, in the embodiment shown, is a prism/lens. A perspective view of the prism/lens 26 is shown in FIG. 4. The prism/lens 26 includes four flat faces or facets 28a–28d on its front side. The bottom or back side 30 forms a curved lens or focusing element. Like the pyramid prism 16, the prism/lens 26 is a monolithic element made from a single piece of optical material such as glass. The element is formed by standard commercial glass processing techniques such as polishing, grinding, etc.

Referring back to FIG. 2, each facet 28a–28d of the prism/lens 26 receives one of the beamlets 20a–20d, respectively. Each facet 28a–28d redirects its respective beamlet 20a–20d such that after leaving the prism/lens 26, the beamlets 21a–21d propagate toward each other. The curved back surface 30 of the prism/lens 26 serves to focus the individual beamlets 21a–21d to form images of each individual entrance pupil segment or region. These images are formed at an image plane 35 at the exit pupil or exit aperture 34 of the system 10. The image plane 35 is labeled A' to indicate that it is a conjugate plane of entrance pupil plane A. Thus, the prism/lens 26 provides two functions. It forms images of the individual entrance pupil segments and simultaneously directs the images together at the exit pupil 34 of the system such that the images of the entrance pupil segments are superimposed upon each other at the exit pupil 34 to form the homogenized output beam 37.

A field lens 36 is also included in the embodiment of FIG. 2. It is used to direct the energy from the homogenizer into subsequent optical components.

Figure 5:
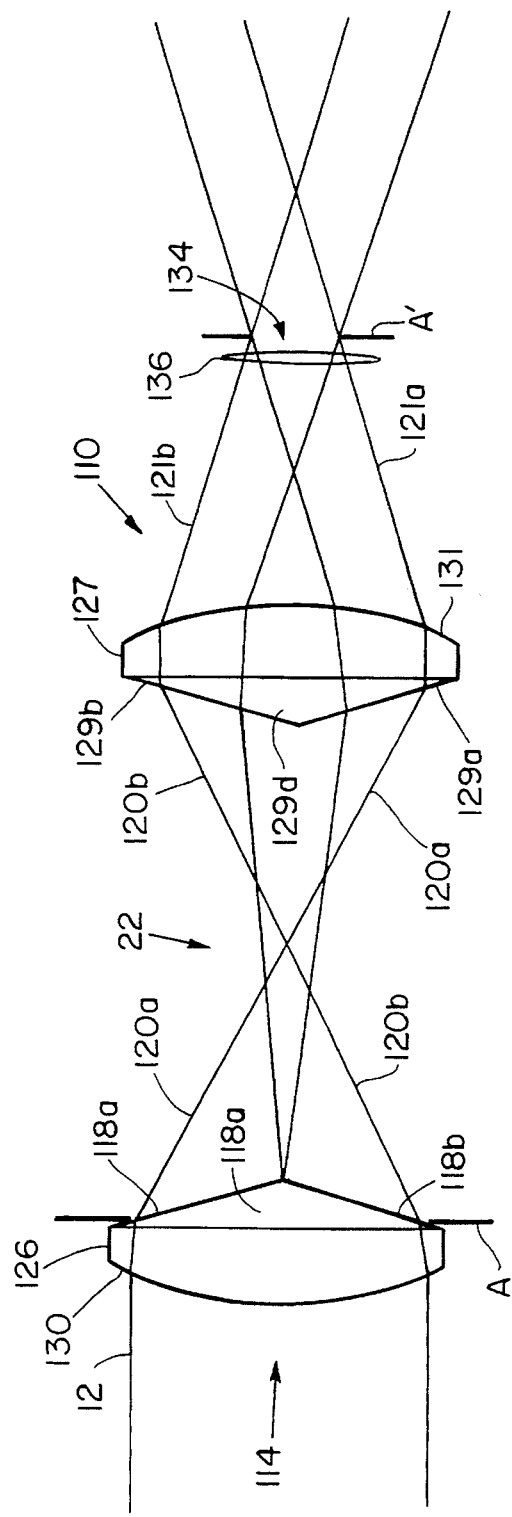
FIG. 5 is a schematic diagram of an alternative embodiment of the beam homogenizer of the present invention.

FIG. 5 is a schematic representation of another embodiment 110 of the beam homogenizer of the present invention. This embodiment uses two prism/lenses 126 and 127 instead of the pyramid prism 16 and prism/lens 26 of the previously described embodiment. The non-uniform beam of light 12 enters the system 110 through entrance pupil 114 defined at the entrance pupil plane A and strikes the curved back surface 130 of prism/lens 126. Focused beamlets 120a–120d are directed by facets 118a–118d, respectively, toward each other such that they cross in a region labelled 122. It should again be noted that facet 118c and beamlets 120c and 120d created by facets 118c and 118d are not shown for clarity. The beamlets 120a–120d diverge from each other toward the second prism/lens 127. Facets 129a–129d of prism/lens 127, receive beamlets 120a–120d, respectively, and direct them toward each other such that beamlets 121a–121d out of prism/lens 127 cross at the exit aperture 134 of the system. The curved back surface 131 of prism/lens 127 collimates the light of each beamlet such that the output beam comprises beamlets 121a–121d superimposed at the exit pupil 134 at the image plane labeled A', the conjugate plane of the input pupil plane A. Field lens 136 is used to direct the energy from the homogenizer into subsequent optical components.

FIG. 6 is a schematic illustration of another embodiment 210 of the beam homogenizer of the invention. This embodiment is identical to the embodiment of FIG. 5 with the exception of prism/lens 227. Facets 229a–229d direct focussed beamlets 121a–121d, respectively, toward each other such that they cross at the exit aperture or exit pupil 234. The curved surface 231 is selected such that the beamlets 221a–221d are converging as they exit through the exit pupil 234. In contrast, in the embodiment of FIG. 5, the beamlets 121a–121d contained collimated light. As in the other embodiments, a field lens 236 directs the energy from the homogenizer into subsequent optical components. Also, the entrance pupil plane A and exit pupil plane A' are conjugates, i.e., the entrance pupil is reimaged at the exit pupil.

Figure 8:
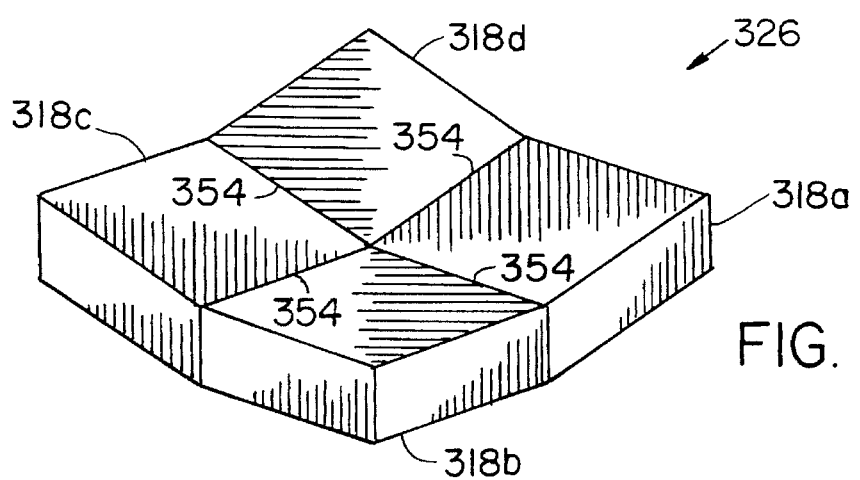
FIG. 8 is a schematic perspective view of a plate prism used in the embodiment of the invention shown in FIG. 7.

FIG. 7 schematically depicts another embodiment 310 of the beam homogenizer of the present invention. This embodiment utilizes a plate prism 326 to divide the input beam 12 into individual beamlets 352a–352d. FIG. 8 is a schematic perspective view of the plate prism 326 having four flat sides 318a–318d. The four flat sides 318a–318d are four flat pieces of glass or other optical material with beveled mating edges 354 as shown. The edges are formed such that when the sides are placed together, mechanical pressures can hold them in place and stationary with respect to each other.

Referring back to FIG. 7, the non-uniform input beam 12 enters the system 310 through entrance pupil 314 at entrance pupil plane A and strikes the plate prism 326. The four flat sides 318a–318d split the input beam 12 into four individual beamlets 352a–352d, respectively. As with the other embodiments, it will be understood that only two of the beamlets are shown in the two-dimensional figure. It will also be understood that the plate prism 326 can have any number of sides. Four sides are used for illustration purposes only. The beamlets 352a–352d are directed to a lens 350 which focuses each of the beamlets and directs the focussed beamlets 320a–320d toward each other. The beamlets cross at a region 322 and begin propagating away from each other. The beamlets then strike prism/lens 327. Beamlets 320a–320d strike flat faces or facets 328a–328d, respectively of the prism/lens 327, and the facets 328a–328d redirect the beamlets 321a–321d toward each other. The curved surface 331 serves to refocus the beamlets such that an image of each segment of the entrance pupil 314 is formed at exit pupil 334 at image plane A', the conjugate plane of the entrance pupil plane A. As in the other embodiments, the pupil segment images are superimposed upon each other at the image plane A' such that a uniform output beam results. A field lens 336 is used to direct the energy from the homogenizer into subsequent optical components.

Figure 9:
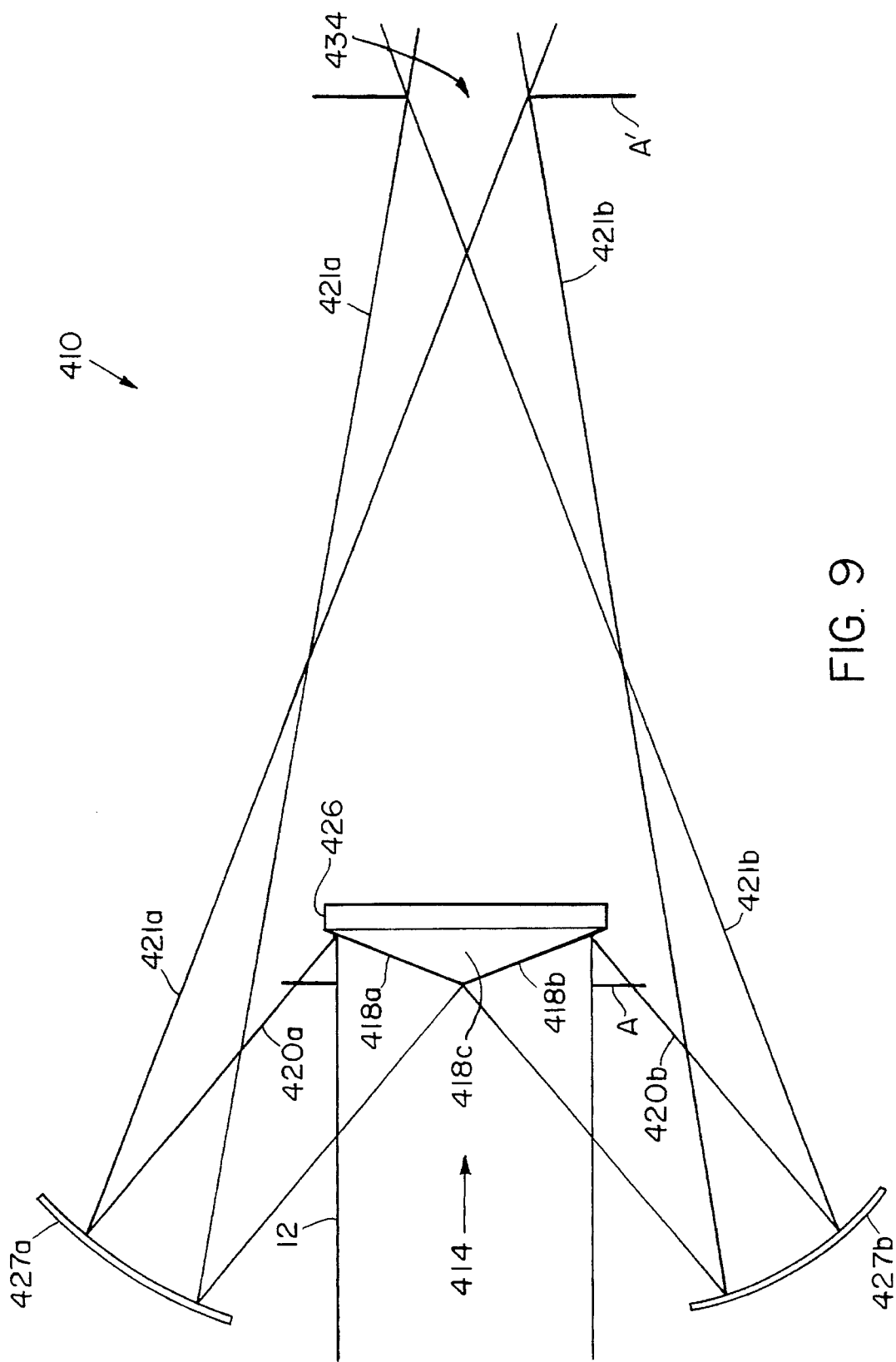
FIG. 9 is a schematic diagram of an alternative embodiment of beam homogenizer of the present invention using reflective optics.

FIG. 9 is a schematic illustration of another embodiment 410 of the beam homogenizer of the invention. This embodiment uses reflective surfaces rather than refractive elements to perform the homogenization process. The beam of light 12 propagates through entrance pupil 414 at entrance pupil plane A. The beam strikes optical element 426 which has four flat reflecting surfaces 418a–418d. The back surface 418d is not shown in the two-dimensional drawing. The configuration of the optical element 426 is similar to the pyramid prism shown in FIG. 3 except that the flat surfaces 418a–418d are coated with a reflective coating. Light does not pass through the element 426; rather, it is reflected by the reflective surfaces 418a–418d.

Referring to FIG. 9, each flat surface 418a–418d effectively segments the entrance pupil by splitting the input beam 12 into four individual beamlets 420a–420d, respectively. Each beamlet 420a–420d strikes a respective curved reflecting surface 427a–427d. The curved surfaces focus the beamlets and reflect the focused beamlets 421a–421d back toward each other in the direction of the exit pupil or aperture 434. The curved surfaces 427a–427d focus each respective beamlet such that an image is formed of each entrance pupil segment at the exit pupil 434 at the image plane A', the conjugate of entrance pupil plane A. In addition, the surfaces 427a–427d direct the segment images toward each other such that they are superimposed upon each other at the exit pupil 434. Once again, a uniform output beam is created from the non-uniform input beam 12. It should again be noted that beamlets 420c, 420d, 421c and 421d and reflective surfaces 427c and 427d are not shown in the interest of clarity. Also, four flat surfaces 418a–418d are used for illustration purposes only. Any number of surfaces may be used.

Figure 10:
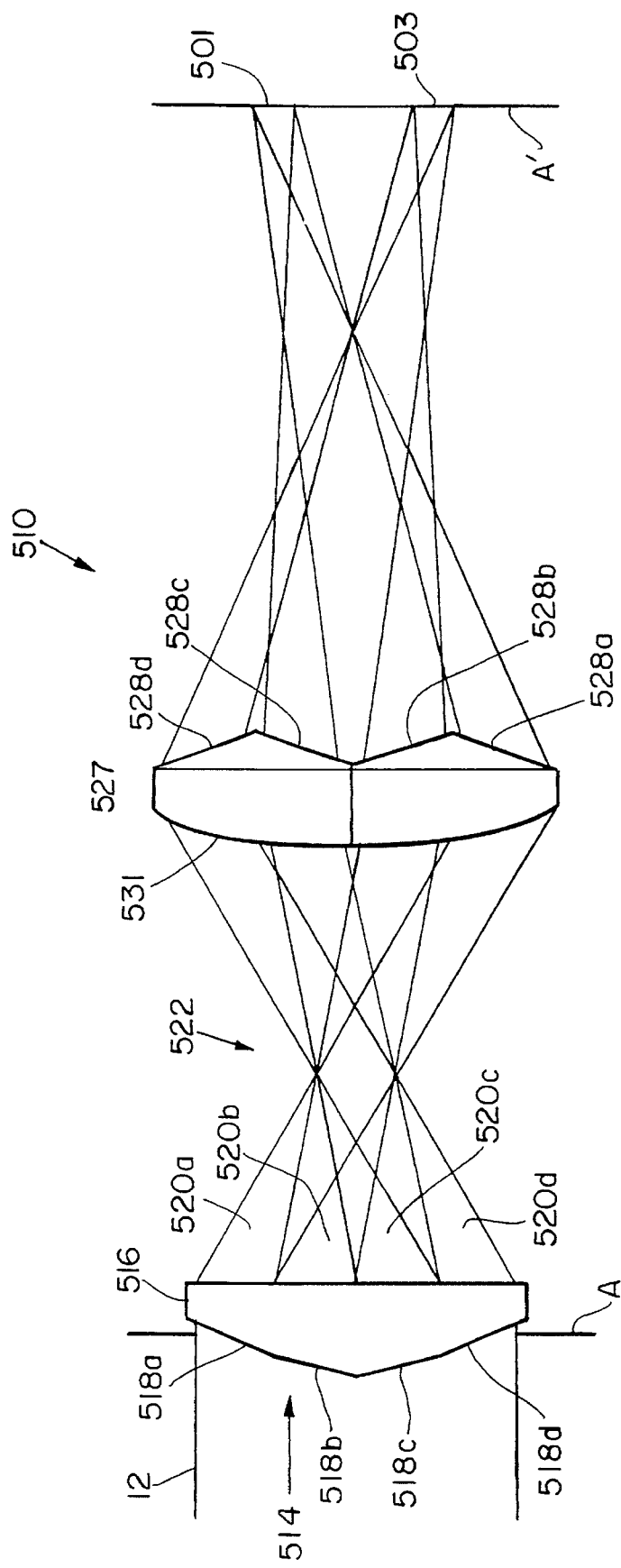
FIG. 10 is a schematic diagram of another alternative embodiment of the beam homogenizer of the present invention in which multiple uniform output beams are produced.

FIG. 10 is a schematic illustration of an alternative embodiment of the beam homogenizer of the invention in which multiple homogenized or uniform output beams are produced. The non-uniform input beam 12 propagates through the entrance pupil 514 at plane A and strikes a first optical component 516. The component 516 has multiple flat surfaces or facets. The drawing of FIG. 10 is shown in two dimensions only to maintain clarity of the description. Therefore, only four flat surfaces 518a–518d are shown. It will be understood that the component 516 can include many more facets or flat surfaces in three dimensions. Four beamlets 520a–520d are produced by the four facets 518a–518d, respectively. These are directed toward each other and cross at the region labeled as 522.

After the beamlets 520a–520d cross, they continue propagating in a divergent pattern until they reach the second optical component 527. The second component 527 includes a curved cylindrical surface 531 which serves to focus the beamlets. The opposite side of the component 527 includes multiple flat surfaces or facets. In the embodiment shown, the component 527 includes four facets 528a–528d used to redirect the beamlets toward the image plane A'. The relative angles between the facets 528a–528d are chosen to direct the beamlets such that the images of the pupil segments are formed at desired positions. Selected images are superimposed over each other at the image plane to produce multiple uniform output beams 501 and 503. Only two output beams are shown in the figure. However, it will be understood that as many beams as are desired can be produced, depending upon the optical components 516 and 527.

It should also be noted that the component 527 includes negative-angle optical surfaces. Specifically, facets 528b and 528c form a negative-angle relationship with each other. This allows beamlets from different parts of the input beam to be superimposed over each other at the image plane, resulting in a more uniform beam. For example, in the embodiment shown, the output beam 501 includes the light from beamlet 520a at the top of the input beam superimposed over the light from beamlet 520c from the lower middle of the input beam. Once again, as with the other embodiments, the entrance pupil segments are reimaged at the exit pupil. That is, the entrance pupil plane A and the exit pupil image plane A' are conjugate planes. Also, the component 527 is a multiple-piece component, as indicated by the line through its central axis.

While this invention has been particularly shown and described with references to preferred embodiments thereof, it will be understood by those skilled in the art that various changes in form and details may be made therein without departing from the spirit and scope of the invention as defined by the appended claims. For example, one skilled in the art will recognize that the order in which the beam strikes the front and back sides of the optical elements can be changed without departing from the spirit and scope of the invention. For example, in the embodiment of the invention shown in FIG. 2, the pyramid prism 16 can be flipped such that the input beam strikes the flat bottom surface and then passes through the prism 16 where it strikes the four facets 18a–18d and is divided into individual beamlets 20a–20d. The other optical elements can also be flipped in a similar manner. Also, the second optical component need not be a single element with multiple flat faces. It can comprise several individual pieces such as prisms, each with a single flat surface. Also, it can be multiple separate pieces, each having multiple flat surfaces.

The invention claimed is:

1. An optical beam homogenizer comprising:
   an entrance pupil through which an optical beam propagates;
   a first optical component having a plurality of flat surfaces for splitting the optical beam into a plurality of beamlets, each beamlet containing light from a respective segment of the entrance pupil; and
   a second optical component for receiving the beamlets and forming an image of each segment of the entrance pupil at an image plane, the second optical component directing the beamlets such that images of segments of the entrance pupil are superimposed upon each other at the image plane.

2. The optical beam homogenizer of claim 1 wherein the second optical component directs the beamlets toward each other to produce a single uniform output beam.

3. The optical beam homogenizer of claim 1 wherein the second optical component directs the beamlets such that a plurality of uniform output beams are produced.

4. The optical beam homogenizer of claim 1 wherein the first optical component is a monolithic optical element.

5. The optical beam homogenizer of claim 1 wherein the first optical component comprises a multiple-piece optical element.

6. The optical beam homogenizer of claim 1 wherein the first optical component comprises a plurality of optical elements.

7. The optical beam homogenizer of claim 1 wherein the first optical component comprises a prism.

8. The optical beam homogenizer of claim 1 wherein the first optical component comprises a pyramidal prism.

9. The optical beam homogenizer of claim 1 wherein the first optical component comprises a plate prism.

10. The optical beam homogenizer of claim 1 wherein the first optical component comprises a prism/lens.

11. The optical beam homogenizer of claim 1 wherein the first optical component comprises a lens.

12. The optical beam homogenizer of claim 1 wherein the first optical component comprises a mirror.

13. The optical beam homogenizer of claim 1 wherein the first and second optical components comprise positive-angle optics.

14. The optical beam homogenizer of claim 1 wherein the first optical component comprises positive-angle optics.

15. The optical beam homogenizer of claim 1 wherein the second optical component comprises positive-angle optics.

16. The optical beam homogenizer of claim 1 wherein the optical beam is a laser beam.

17. The optical beam homogenizer of claim 1 wherein each of the beamlets propagates along a longitudinal axis, all of the longitudinal axes crossing between the first optical component and the second optical component.

18. The optical beam homogenizer of claim 1 wherein the second optical component is a monolithic optical element.

19. The optical beam homogenizer of claim 1 wherein the second optical component comprises a multiple-piece optical element.

20. The optical beam homogenizer of claim 1 wherein the second optical component comprises a plurality of optical elements.

21. The optical beam homogenizer of claim 1 wherein the second optical component comprises a prism.

22. The optical beam homogenizer of claim 1 wherein the second optical component comprises a pyramidal prism.

23. The optical beam homogenizer of claim 1 wherein the second optical component comprises a prism/lens.

24. The optical beam homogenizer of claim 1 wherein the second optical component comprises a lens.

25. A method of homogenizing an optical beam comprising:

allowing the optical beam to propagate through an entrance pupil;

providing a first optical component for receiving the optical beam from the entrance pupil;

splitting the optical beam into a plurality of beamlets with a plurality of flat surfaces on the first optical component, each beamlet containing light from a respective segment of the entrance pupil;

with a second optical component, forming an image of each segment of the entrance pupil at an image plane; and with the second optical component, directing the beamlets such that images of entrance pupil segments are superimposed upon each other at the image plane.

26. The method of claim 25 further comprising the step of, with the first optical component, directing the beamlets toward each other such that they cross between the first optical component and the second optical component.

27. The method of claim 25 wherein the second optical component directs the beamlets toward each other to produce a single uniform output beam.

28. The method of claim 25 wherein the second optical component directs the beamlets such that a plurality of uniform output beams are produced.

29. An optical beam homogenizer comprising:

an entrance pupil through which an optical beam propagates;

a first optical component having a plurality of flat surfaces for splitting the optical beam into a plurality of beamlets, each beamlet containing light from a respective segment of the entrance pupil and propagating along a longitudinal axis; and a second optical component for receiving the beamlets and forming an image of each segment of the entrance pupil at an image plane, the longitudinal axes of the beamlets crossing between the first optical component and the second optical component and the second optical component directing the beamlets such that images of segments of the entrance pupil are superimposed upon each other at the image plane.

30. A method of homogenizing an optical beam comprising:

allowing the optical beam to propagate through an entrance pupil;

providing a first optical component for receiving the optical beam from the entrance pupil;

splitting the optical beam into a plurality of beamlets with a plurality of flat surfaces on the first optical component, each beamlet containing light from a respective segment of the entrance pupil;

with a second optical component, forming an image of each segment of the entrance pupil at an image plane, the first optical component directing the beamlets toward each other such that they cross between the first optical component and the second optical component; and with the second optical component, directing the beamlets such that images of entrance pupil segments are superimposed upon each other at the image plane.

* * * * *